J. Bond,
Riding Stirrup,
Nº 83,450.   Patented Oct. 27, 1868.

Witnesses:
Wm. A. Morgan
G. C. Lotton

Inventor:
John Bond
per Munn & Co.
Attorneys

JOHN BOND, OF VERSAILLES, ILLINOIS.

Letters Patent No. 83,450, dated October 27, 1868

IMPROVED STIRRUP.

The Schedule referred to in these Letters Patent and making part of the same.

*To all whom it may concern:*

Be it known that I, JOHN BOND, of Versailles, in the county of Brown, and State of Illinois, have invented a new and useful Improvement in Stirrups; and I do hereby declare that the following is a full, clear, and exact description thereof, which will enable those skilled in the art to make and use the same, reference being had to the accompanying drawings, forming part of this specification.

The object of this invention is to provide an improved stirrup, with an oscillating bottom, that shall be more agreeable to the rider, and which will, in case the rider is thrown from the horse, readily open and disengage his foot. It consists in providing a swinging foot-piece, so connected to the pendent strap as to become disconnected, when, by any cause, they are spread outward sufficiently, and for which purpose they are made sufficiently flexible.

In the drawings—

Similar letters of reference indicate corresponding parts.

A represents the pendent forked portion of the stirrup, which is provided with a foot-piece, B, having trunnions C C, which fit into holes in the lower ends of the prongs of the part A, which are made of elastic material, but of a sufficient degree of rigidity to retain the foot-piece in position in the ordinary use of the stirrup, but which are sufficiently elastic to spread open far enough to disconnect the foot of the rider, in case he falls from the horse, and his feet become twisted in the stirrups.

Figure 1:
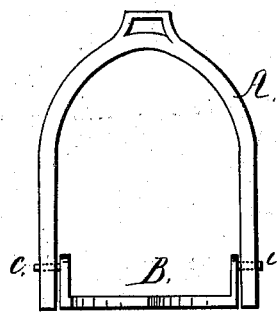
Figures 1 and 3 represent front elevations of my improvement.
Figure 2:
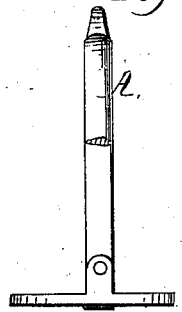
Figures 2 and 4 represent side views of the same.
Figure 3:
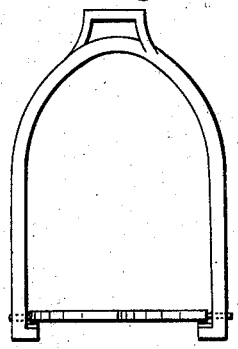
Figure 4:
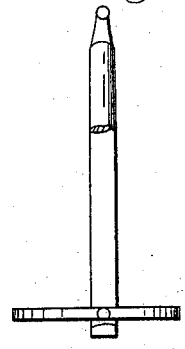

In figs. 1 and 2, I have shown the foot-piece B, arranged so as to be unlimited in its oscillation, but in figs. 3 and 4, I have shown projections on the inner sides of the lower ends of the prongs, inclined in each direction from the centre, and arranged to arrest the movement of the foot-piece in either direction.

The faces of the lugs may be made more or less oblique, to suit the taste of the rider.

The foot-piece may be made of any desired form, length, and proportion that may be desired.

An oscillating foot-piece, arranged as above described, will accommodate itself to the foot under all the changes of position of the rider, due to the undulating motion arising from the action of the horse.

I claim as new, and desire to secure by Letters Patent—

As a new article of manufacture, the riding-stirrup, consisting of the elastic pendent prongs, A, between which the oscillating foot-piece B is pivoted in such a manner as to fall out when the elastic prongs are spread apart, as herein described, for the purpose specified.

The above specification of my invention signed by me, this 9th day of April, 1868.

JOHN BOND.

Witnesses:
   J. F. WILLIAMS,
   E. D. HUNTER.